United States Patent [19]
Meier

[11] Patent Number: 5,541,604
[45] Date of Patent: Jul. 30, 1996

[54] TRANSPONDERS, INTERROGATORS, SYSTEMS AND METHODS FOR ELIMINATION OF INTERROGATOR SYNCHRONIZATION REQUIREMENT

[75] Inventor: Herbert Meier, Moosburg, Germany

[73] Assignee: Texas Instruments Deutschland GmbH, Germany

[21] Appl. No.: 117,258

[22] Filed: Sep. 3, 1993

[51] Int. Cl.⁶ ................................................. G01S 13/74
[52] U.S. Cl. ........................... 342/42; 342/44; 342/50; 342/51
[58] Field of Search ........................... 342/42, 44, 50, 342/51

[56] References Cited

U.S. PATENT DOCUMENTS

| | | | |
|---|---|---|---|
| 3,713,148 | 1/1973 | Cardullo et al. | 343/6.8 R |
| 4,550,444 | 10/1985 | Uebel | 455/41 |
| 4,912,471 | 3/1990 | Tyburski et al. | 342/42 |
| 5,053,774 | 10/1991 | Schuermann et al. | 342/44 |
| 5,302,954 | 4/1994 | Brooks et al. | 342/44 |
| 5,351,052 | 9/1994 | D'Hont et al. | 342/42 |

*Primary Examiner*—J. Woodrow Eldred
*Attorney, Agent, or Firm*—Brian C. McCormack; James C. Kesterson; Richard L. Donaldson

[57] ABSTRACT

A Radio Frequency Identification (RFID) system having an interrogator (12) and a transponder (14). The interrogator has a first tuned circuit (28) of a powering frequency for sending a powering burst to a transponder (14), a filter/demodulator (64) for receiving an wireless, modulated RF response from a transponder (14). The interrogator (12) further has a second tuned circuit (29) in electrical communication with a modulator (48), the second tuned circuit (29) having a selected bandwidth about a communication frequency, the selected bandwidth not substantially overlapping the powering frequency and encompassing the bandwidth of the modulated carrier of the RF response. The interrogator also has a controller (16) in electrical communication with the filter/demodulator (64) and the tuned circuits (28,29) and capable of enabling the first tuned circuit (28) to send the powering burst during a first time period and of enabling the modulator (48) in electrical communication with the second tuned circuit (29) to receive the RF response during a second time period. The transponder has a tuned circuit (34), a tuning circuit (54,56) in electrical communication with the tuned circuit (34) for modifying the frequency characteristics of the tuned circuit (34) such that it is can be tuned during the powering burst to the powering frequency and to be tuned during the RF response to the communication frequency. The transponder (14) also includes a demodulator (66) in electrical communication with the tuned circuit (34) for receiving the RF interrogation therefrom and for demodulating data from the RF interrogation.

19 Claims, 4 Drawing Sheets

TRANSPONDERS, INTERROGATORS, SYSTEMS AND METHODS FOR ELIMINATION OF INTERROGATOR SYNCHRONIZATION REQUIREMENT

CROSS-REFERENCE TO RELATED PATENTS

The following coassigned patent applications are hereby incorporated herein by reference:

| Pat No./Serial No. | Filing Date | TI Case No. |
| --- | --- | --- |
| 5,053,774 | 2/13/91 | TI-12797A |
| 07/981,635 | 11/25/92 | TI-16688 |
| 08/048,541 | 4/14/93 | TI-16980 |

FIELD OF THE INVENTION

This invention generally relates to a fast read/write Radio Frequency Identification (RFID) System. A number of interrogators may be operable simultaneously in the same geographic area by sending powering signals to transponders or with a powering signal that is outside its communication frequencies. The transponder preferably adapts itself to receive the powering signals by changing its tuned frequency to that of the powering signal.

BACKGROUND OF THE INVENTION

Heretofore, in this field, a powering antenna has often been provided with the interrogator in addition to the communicating antenna. This powering antenna is provided for the powering of a transponder not having its own internal power supply. The powering antenna may be a high Q-factor antenna to effect maximum power transfer to the transponder. Because of the flexibility afforded by having a separate power antenna in the interrogator, which may be optimized for power transfer to the transponder, the transponder antenna may be optimized for communicating with the interrogator's communicating antenna. An example of this type of system is given in U.S. Pat. No. 4,550,444 by Uebel and in U.S. Pat. No. 4,912,471 by Tyburski et al. In such systems the RF coupling can be separately designed for the power transfer link and the communications link. The disadvantage in such a system is the inherently greater cost and size involved in a transponder having two separate circuits for powering and communicating. Another known technique allowing for somewhat optimized powering and communication links is to provide separate transmit and receive antennas in the transponder. In this way the downlink (i.e., the communication link from the interrogator to the transponder) can be designed for efficient power transfer. Because the transponder is desirably compact and power-efficient, the uplink (i.e., the communication link from the transponder to the interrogator) can be optimized to the transponder's transmit antenna. Communication can still be effectively carried out over the downlink because of the lesser need for power and cost efficiency in the interrogator transmitter design. An example of this type of system can be found in U.S. Pat. No. 3,713,148 by Cardullo et al. As before, the disadvantage in such a system is the inherently greater cost and size involved in a transponder having two separate circuits, this time for receiving and transmitting.

Yet another known technique is described in U.S. Pat. No. 5,053,774 by Schuermann, et al. In this technique, communication and power transfer is preferably accomplished by a single resonant circuit in each of the interrogator and the transponder thereby minimizing cost, size and power efficiency. The resonant circuit in each of the interrogator and the transponder is used for both communication and power transfer in this prior art. For optimal power transfer the prior art device uses highly tuned, high Q-factor resonant circuits. Because in this technique the same resonant circuit is used in each of the interrogator and transponder for powering and/or bi-directional data communication, interrogators that are operating in close proximity to each other must be synchronized so that the RF power transmission phases, or powering signals do not interfere with the communication signals. In the case of interrogators and transponders that communicate bi-directionally, the data transmissions from the interrogators must also be synchronized so that a data transmission from one interrogator to a transponder does not interfere with the generally lower amplitude data transmission from a transponder to another interrogator.

SUMMARY OF THE INVENTION

The preferred embodiment of the present invention overcomes the difficulties described above in that it allows the use of a single set of circuitry in each of the interrogator and the transponder for transmission and reception of both powering and communication signals without the need for synchronization between interrogators. In the preferred embodiment, as in the '774 patent by Schuermann, a single resonant circuit is implemented in each of the interrogator and the responder for maximum efficiency of cost, size, and power consumption. The preferred embodiment of the present invention, however, also eliminates the synchronization requirement for adjacent interrogators. The interrogator sends a powering burst to the transponder during which the interrogator and transponder are tuned with high Q-factor resonant circuits of a frequency $f_1$. The interrogator then begins to transmit WRITE data to the transponder using pulse width modulation (PWM), pulse position modulation (PPM), frequency-shift keying modulation (FSK), or another type of modulation. For PPM or PWM, the interrogator would transmit the modulation using frequency $f_1$. For FSK, frequencies $f_1$ and $f_4$ might be used. For receiving PPM or PWM modulation, the transponder would preferably keep its resonant circuit at frequency $f_1$ and tuned with a high Q-factor. For receiving FSK, the transponder preferably adapts itself by lowering the Q-factor of its resonant circuit. The transponder is thus more able to interpret the larger bandwidth FSK signal of frequencies $f_1$ and $f_4$. The transponder's resonant circuit preferably adapts itself to the center of the FSK frequencies. The interrogator receiver preferably has a passband characteristic that is symmetric about $f_2$ and $f_3$. The filter pass band is preferably either above or below the power transmission frequency $f_1$. For an FSK system, the filter passband is further preferably above or below the FSK frequency, $f_4$. If a separate receive antenna is provided in the interrogator, this receive antenna may remain a low Q-factor antenna.

DETAILED DESCRIPTION OF PREFERRED EMBODIMENTS

Figure 1:
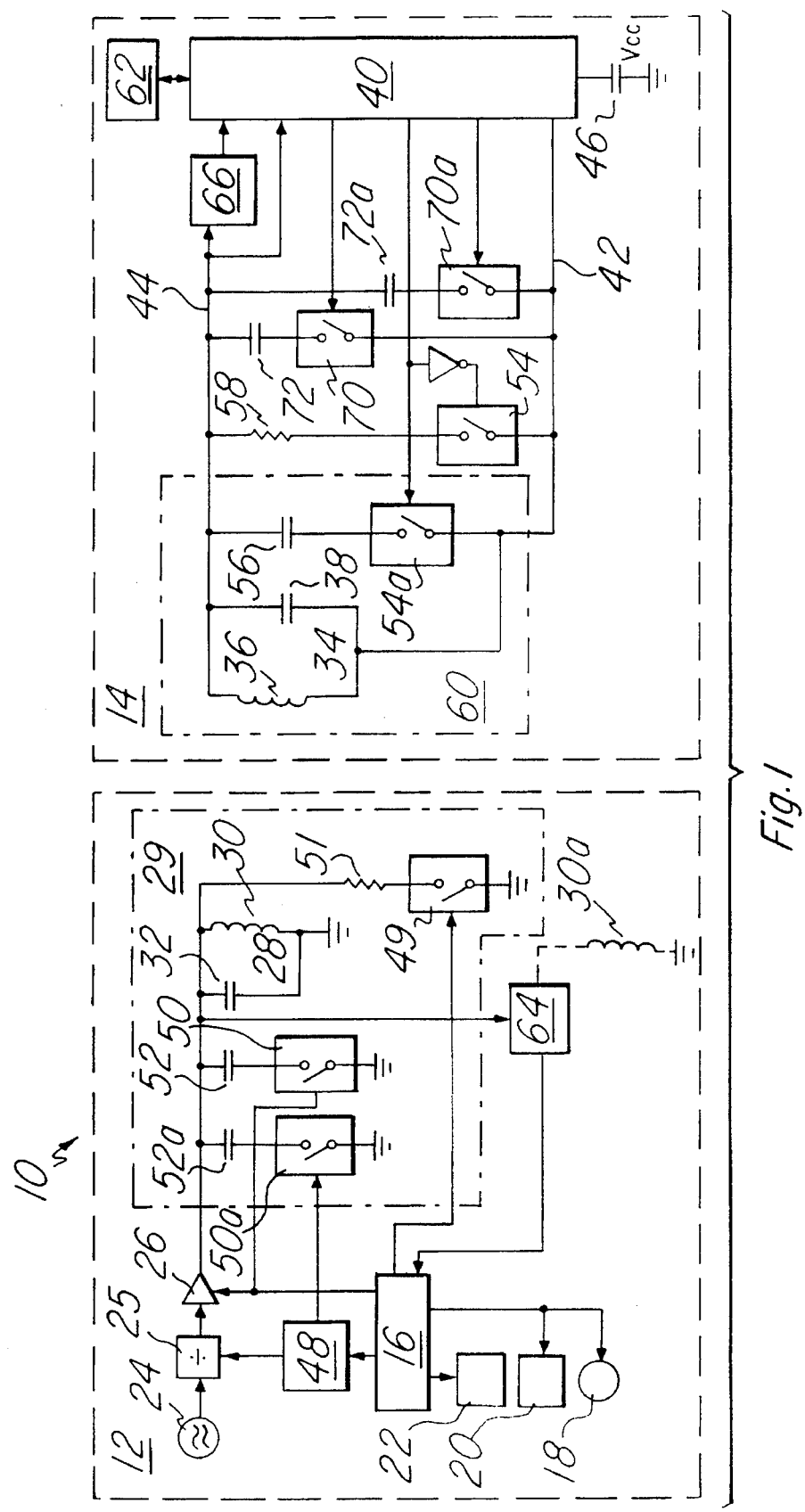
FIG. 1 is a block circuit diagram of the preferred FSK system embodiment.

FIG. 1 shows a transponder arrangement 10 comprising an interrogator 12 and a responder or transponder 14. The interrogator 12 preferably comprises a control circuit 16 which controls the actions of the interrogator circuitry. The control circuit 16 causes the modulator 48 to generate either the powering frequency $f_1$ or the second communication or "Write" frequency $f_4$. In the illustrated FSK embodiment the first and second frequencies $f_1$ and $f_4$ are used to represent two logic states of the WRITE data while the powering frequency $f_1$ is used as a powering signal. FSK keying is accomplished by control circuit 16 controlling modulator 48 to open and close a switch 50a thereby changing the resonant frequency of the resonant circuit 28 by connecting a capacitor 52a in parallel with the resonant circuit 28. Resonant circuit 28 is preferably the parallel combination of coil or antenna 30 and capacitor 32. Alternatively, a second coil or antenna 30a may be included to act as a separate receive antenna while the antenna 30 acts as the transmit antenna. As yet another alternative, either or both a receive antenna and a transmit antenna may be provided in addition to the resonant circuit 28. The modulator 48 further changes the division factor of the programmable divider 25 to divide the reference carrier by a selectable ratio ($n_1$, $n_4$) to one of two selectable frequencies ($f_1$, $f_4$). The control circuit 16 further controls a switch 50 to change the resonant frequency of resonant circuit 28 by connecting a capacitor 52 in parallel with the resonant circuit 28. When the switch 50 is open and the switch 50a is closed, the resonant circuit 28 oscillates at frequency $f_1$. In one embodiment, $f_1$ and $f_4$ are chosen to be higher than $f_2$ and $f_3$ (see FIG. 4). When switch 50a is opened, the resonant circuit 28 will resonate at the Write frequency $f_4$. The closing of switch 50 by control circuit 16 will lower the resonant frequency of the resonant circuit to be between $f_2$ and $f_3$ such that the interrogator 12 is operable to receive a response signal from the transponder 14 (Read mode). For receiving the RF response, the power stage or amplifier 26 is normally turned off during the response time period. The value of capacitors 52, 52a may be chosen such that switch 50a will be open or closed during the Read mode.

Alternatively, $f_1$ and $f_4$ may be chosen to be lower than $f_2$ and $f_3$ in which case switch 50 will be closed and capacitor 52 connected in parallel to the resonant circuit 28 and switch 50a will be open to yield frequency $F_1$. Opening of switch 50 will disconnect capacitor 52 allowing the resonant circuit 28 to resonate at a frequency between $f_2$ and $f_3$. Closing of switch 50a while switch 50 remains closed will allow the resonant circuit 28 to resonate at Write frequency $f_4$.

The interrogator 12 might be a stand alone unit, or alternatively, might be connected by a host connection 18 to a host computer. The control circuit 16 is preferably connected to a memory 20 that is operable to maintain, among other things, a list of instructions for the control circuit 16 to execute, information regarding various transponders 14 and groups of transponders for addressing. The memory 20 is also operable to receive information written to it by control circuit 16. This information may be gained from inquiries of the transponder 14 and may include data and addresses returned by the transponder 14. Yet another component preferably operating under the control of the control circuit 16 is a display 22 that may visually express to a user the results of an interrogation or communicate status information.

Figure 2:
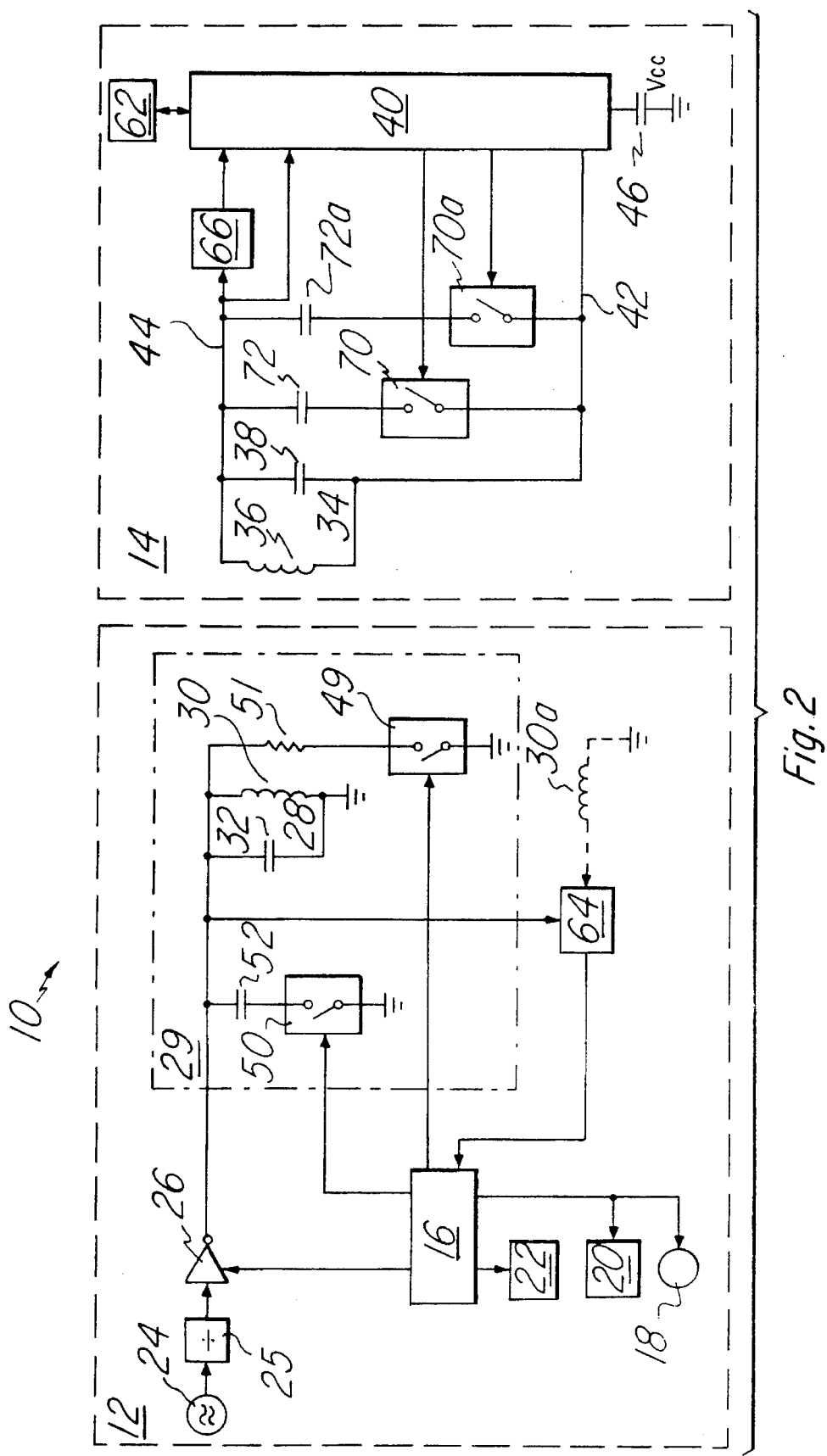
FIG. 2 is a block circuit diagram of the preferred PWM system embodiment.

Referring now to FIG. 2, a PWM preferred embodiment is illustrated. In this embodiment, as in the FSK embodiment, generator 24, divider 25 and power stage 26 generate the powering frequency $f_1$. In the illustrated PWM embodiment the frequency $f_1$ is used to represent both logic states of the WRITE using a single frequency as is well known in the art. This frequency, $f_1$, is preferably also used as a powering signal during the "charge" phase. The PWM keying may be accomplished by control circuit 16 controlling power stage or amplifier 26. Because switch 50 is open, the resonant frequency of the resonant circuit 28 stays at $f_1$. In one embodiment, $f_1$ is chosen to be higher than $f_2$ and $f_3$ (see FIG. 5). In such an embodiment, the closing of switch 50 will lower the resonant frequency of the resonant circuit to be between $f_2$ and $f_3$ and the interrogator 12 is then enabled to receive response signals from the transponder 14. The power stage 26 may be switched off during this Read mode to further minimize potential interference with the response signals.

Alternatively, $f_1$ may be chosen to be lower than $f_2$ and $f_3$ in which case switch 50 will be closed for the Write mode and capacitor 52 connected in parallel to the resonant circuit 28 to yield frequency $f_1$. Opening of switch 50 upon entering the Read mode will allow the resonant circuit 28 to increase its resonance frequency to a frequency between $f_2$ and $f_3$.

Figure 3:
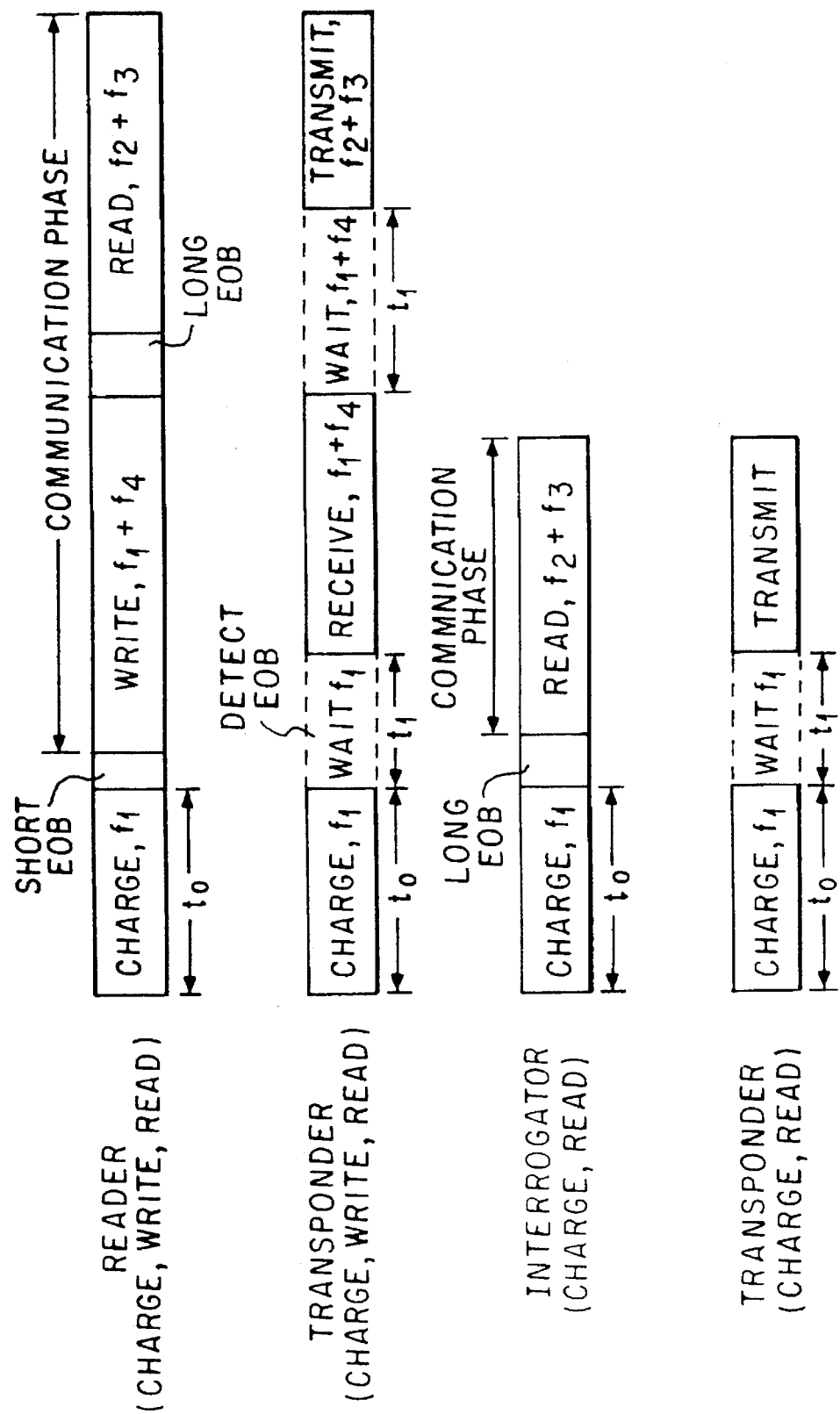
FIG. 3 is a timing diagram of the preferred embodiment.

Referring now to FIG. 3, a timing diagram of the preferred embodiment of the present invention is shown. The timing diagram shown here is divided into two phases. The phases used include a "powering" or "charge" phase and a "communication" phase. The "charge" phase lasts for a duration of $t_0$. During the "charge" phase the interrogator 10 charges the transponder 12 with a powering burst of frequency $f_1$. In the embodiment where the interrogator uses a single antenna 28 for powering and communication, a short "end-of-burst" occurs during which no carrier is transmitted from the interrogator. This short "end-of-burst" is necessary to allow the transponder 12 to differentiate between the "charge" phase and the Write mode of the "communication" phase. The transponder 14 senses the short "end-of-burst" and adjusts its frequency for receiving a signal from the interrogator 12. For FSK frequencies, for example, the frequency of the resonant circuit 34 is lowered to between $f_1$ and $f_4$. For other types of modulation such as PPM or PWM, the transponder 14 may not have to adjust its resonant circuit 34. The transponder 14 may also at this time damp its resonant circuit 34 by connecting a resistor 58 in parallel with resonant circuit 34.

After the "charge" phase and the Write mode of the "communication" phase, the interrogator 12 transmits a longer "end-of-burst" signal. The longer "end-of-burst" signal serves to indicate that the Read mode is about to begin (whether or not a Write mode was previously entered into). This Read mode can occur with or without a preceding Write mode and is tested for by measuring the duration of the "end-of-burst." The transponder resonant circuit 34 does not change until after a delay period, $t_1$. This delay period allows for detection of the "end-of-burst." The duration of this delay period, $t_1$, is greater than that of the long "end-of-burst." After the end of the "end-of-burst" the transponder 14 can now respond to the RF interrogation.

Figure 4:
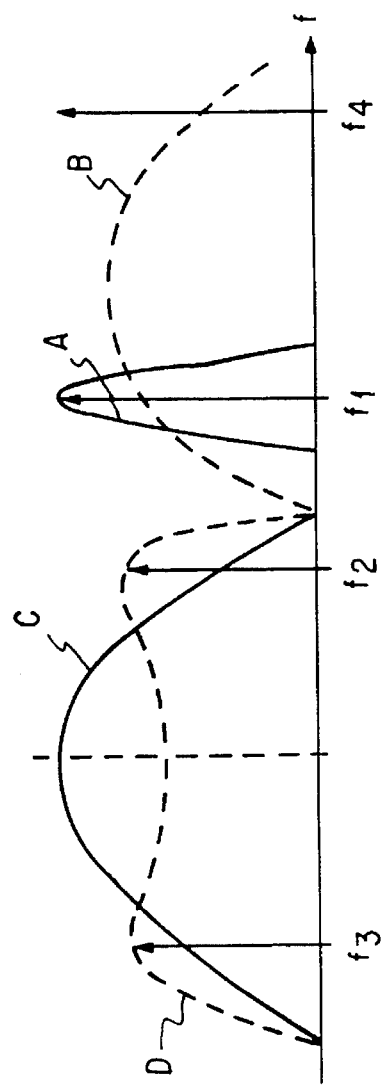
FIG. 4 is a frequency spectrum illustrating the power spectrums for a first preferred FSK embodiment.

FIG. 4 is a frequency spectrum illustrating the power spectrums for the highly tuned and detuned configurations of the transponder 14 and the interrogator 12 (graphs A, B, C, and D) for the embodiment wherein FSK is used for the Write function. Graph A shows the passband for the relatively high Q-factor configuration of the transponder resonant circuit 28 during the charge function. Graph B shows the passband for the relatively low Q-factor configuration of the transponder resonant circuit 28 during the write function. The impulses shown at $f_1$ and $f_4$ show the FSK frequencies sent by the interrogator 12 during the Write function. As can be seen by the figure Graph B encompasses both frequencies $f_1$ and $f_4$. Graph C shows the passband for the interrogator resonant circuit 20,52 (optionally 52a) during its read function. Graph D shows the resulting passband of the filter/demodulator 64 and encompasses the impulses at frequencies $f_2$ and $f_3$, which are the FSK frequencies of the transponder response.

Figure 5:
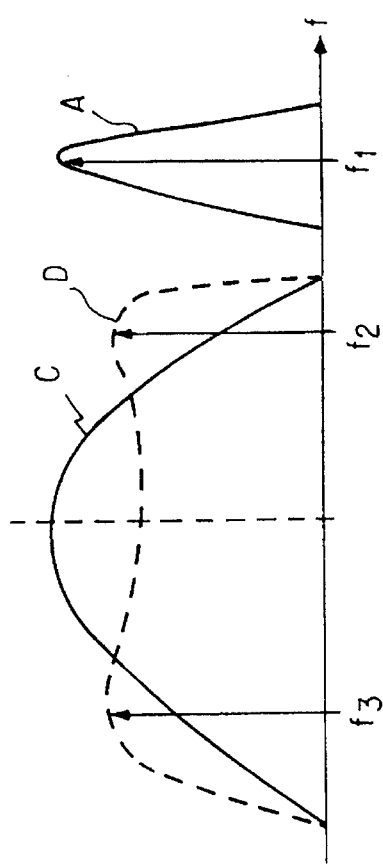
FIG. 5 is a frequency spectrum illustrating the power spectrums for a first preferred PWM embodiment.

FIG. 5 is a frequency spectrum illustrating the power spectrums for the highly tuned and detuned configurations of the transponder 14 and the interrogator 12 (graphs A, C, and D) for the embodiment wherein PWM is used for the Write function. Graph A shows the passband for the relatively high Q-factor configuration of the transponder resonant circuit 28 during the charge function. The impulse shown at $f_1$ shows the frequency sent by the interrogator 12 during the PWM Write function and the powering function. Graph C shows the passband for the interrogator resonant circuit 20,52 during its read function. Graph D shows the resulting passband of the filter/demodulator 64 and encompasses the impulses at frequencies $f_2$ and $f_3$, which are the FSK frequencies of the transponder response.

As previously mentioned, yet other embodiments could include selecting $f_1$ and $f_4$ to be less than $f_2$ and $f_3$. This principle could be applied to either the FSK embodiment or the PWM embodiment. Another embodiment mentioned herein is the PPM embodiment whose structure would be very similar to that for PWM.

Now that the phases and frequency spectrums have been named and listed and an overview of the main components of the transponder system has been described, the remaining components and their uses during each phase will be described.

Again referring to FIG. 1, now together with FIG. 3 and FIG. 4, the remaining components, timing, and frequency spectrum of the preferred embodiment will be described. During the "charge" phase, within the interrogator 12 a carrier wave generator 24 operates to provide a reference frequency to a programmable divider 25. A buffer or amplifier 26 receives a divided carrier having a first frequency, $f_1$, from the programmable divider 25 and passes the signal to an interrogator tuned circuit 28. Tuned circuit 28 is preferably tuned to $f_1$ although it is well known that a harmonic of the resonant frequency $f_1$ or another frequency could be used if design needs so dictate. In this embodiment, the modulator 48 further acts to select the resonant frequency of the tuned circuit 28 to coincide with the corresponding frequency selected by the modulator 48 using the programmable divider 25. The mechanism that modulator 48 and the control circuit 16 uses to select the resonant frequency of tuned circuit 28 is the combination of switches 50,50a. The tuned circuit 28 preferably comprises the parallel combination of a coil 30 and a capacitor 32. The switch 50 when closed forms a parallel connection of another capacitor 52 across tuned circuit 28 thus lowering the resonant frequency of resonant circuit 28 to a frequency between $f_2$ and $f_3$. A series resonant circuit could also be used as tuned circuit 28 if the amp 26 is to drive a low impedance tuned circuit (e.g., a series resonant circuit). The oscillation of this tuned circuit 28 transmits RF energy, which is received by the transponder 14. A transponder resonant circuit 34 that also is tuned ideally to $f_1$ receives this energy. The transponder resonant circuit 34 preferably comprises the parallel combination of a coil 36 and a capacitor 38. A transponder control circuit 40 is connected to this resonant circuit 34 at a reference connection 42 and at a signal connection 44. The control circuit 40 receives its energy from the resonant circuit 34, rectifies the received signals, and stores the energy on a storage capacitor 46. The mechanisms for rectifying signals and storing energy are well known to one of ordinary skill in the art. Examples of circuitry for performing these functions can be found in Josef H. Schuermann's U.S. Pat. No. 5,053,774, assigned to Texas Instruments, Incorporated and incorporated by reference in this application.

As shown in FIG. 3, the "charge" phase is succeeded by the "communication" phase. After the interrogator 12 sends a short "end-of-burst" during which no RF energy is transmitted therefrom, the transponder 14 detects this short "end-of-burst and dampens the resonant circuit 34. Transponder 14 further increases the frequency of resonant circuit 34 to a frequency between $f_1$ and $f_4$ by disconnecting a capacitor 56 and connecting a resistor 58 in parallel with the resonant circuit 34. The transponder 14 is now prepared to receive WRITE data from the interrogator 12.

During the write function of the "communication" phase the control circuit 16 sends data to a modulator 48. An FSK modulator 48 under direction of control circuit 16 operates to control programmable frequency divider 25 to pass either a first frequency, $f_1$, or a second frequency, $f_4$, on to buffer/amplifier 26. The frequencies $f_1$ and $f_4$ are selected submultiples of the reference frequency. The carrier wave generator 24 is preferably a crystal oscillator. As an example, one polarity of the WRITE data might be the reference carrier divided by ratio $n_1(f_1)$, while the other polarity of the WRITE data might be represented by another frequency that is the reference carrier divided by ratio $n_4(f_4)$. The modulator 48 controls a switch 50a that can connect a capacitor 52 in parallel with tuned circuit 28. Control circuit 16 controls a switch 50 that can connect a capacitor 52 in parallel with tuned circuit 28.

Disconnecting the capacitor 52 from the tuned circuit 28 forms a new tuned circuit 29 with a new, higher resonant frequency $f_4$. By opening and closing switch 50a in synchronism with the control of programmable divider 25 the resonant circuit 28 or new resonant circuit 29 remains optimally tuned to the transmitted frequency $f_1$ or $f_4$. By choosing $f_1$ to represent one logic level and $f_4$ to represent another it is possible to transmit information from the interrogator 12 to the transponder 14. Data is received in the transponder 14 by the transponder's resonant circuit 34. A downlink signal is passed on to demodulator 66 that in turn transmits a received data stream to the control circuit 40. The received WRITE data is typically FSK demodulated by the demodulator 66. Techniques and circuits for FSK demodulation are well known in the art.

After the "charge" phase and the Write mode of the "communication" phase, the interrogator 12 transmits a longer "end-of-burst" signal. The longer "end-of-burst" signal serves to indicate that the Read mode is about to begin (whether or not a Write mode was entered into). This Read mode can occur with or without a preceding Write mode and is tested by measuring the duration of the "end-of-burst." The transponder resonant circuit 34 does not change until after a delay period, $t_1$. This delay period, which begins concurrently with the "end-of-burst," but is defined to be slightly longer in duration allows for detection of the "endof-burst." After the end of the "end-of-burst" the transponder 14 can now respond to the RF interrogation. During the delay period, $t_1$, and during the Read mode the interrogator resonant circuit 28 may be damped by connecting a resistor 51 in parallel with the resonant circuit 28. This connection may be accomplished by providing a switch 49 under direction of control circuit 16 serially between the resistor 51 and ground.

A frequency spectrum of a first preferred embodiment is shown in FIG. 4. Graph A shows the frequency response of the resonant circuits 28,34. Because these resonant circuits 28,34 have a high Q, the graph has a very narrow base and a high peak. Graph B shows the effect on resonant circuit 34 in closing switch 54 and opening switch 54a to form new resonant circuit 60. Graph B is centered between $f_1$ and $f_4$ and has a broad base which does have a significant frequency response at both $f_1$ and $f_4$. Because the resonant circuits 28,60 are no longer tightly coupled during the "communication" phase, the energy transmission from the interrogator 12 to the transponder 14 is reduced. Thus, the storage capacitor 46 supplies energy to the transponder circuitry for the transponder 14 to remain operational.

Again referring to FIG. 1, during READ function the interrogator tuned circuit 28 is damped to enable downlink FSK reception. The interrogator tuned circuit 28 might be damped by the control circuit 16 by disabling the carrier wave generator 24 and by shunting a switch/resistor series 49,51 combination across the resonant circuit. This damping of the carrier wave generator 24 is described in the '774 patent by Schuermann et al. Once the oscillation of resonant circuit 28 is damped, the interrogator 12 is free to receive signals from the transponder 14. Within the transponder 14, the resonant circuit 34 continues to oscillate until the energy stored therein is dissipated. The transponder 14 can now respond to the interrogator 12 by using a switch 70 to connect capacitor 72 and switch 70a to connect capacitor 72a across the resonant circuit 34. Now in the transponder's 14 response to the interrogator 12 READ data is represented upon the uplink signal by a first frequency, $f_2$, that might be the resonant frequency, $f_2$ of capacitor 72a in parallel with resonant circuit 34 and by a second frequency, $f_3$, which might be the resonant frequency of capacitor 72 and capacitor 72a in parallel with resonant circuit 34. Thus, the first frequency might represent the transmission from the transponder to the interrogator of a digital ONE or the high-bit frequency and the second frequency might represent the transmission of a digital ZERO or the low-bit frequency. This uplink is then demodulated by the interrogator demodulator 64 and supplied to control circuit 16 that may store the data in memory 20, transmit the data to a host via the connection 18, or display status information or data to an operator on a display 22.

Because the power transmission frequency, $f_1$, and the write frequencies $f_2$ and $f_4$, are out of the passband of the interrogator receive circuit, other active interrogators 12 do not interfere with the receiving in said interrogator 12 of RF responses from the transponder 14.

In some embodiments upon receipt and demodulation of the downlink signal the control circuit 40 writes to memory 62. In yet another embodiment, a separate receive circuit can be provided in the interrogator 12. In such an embodiment, switches 49 and 50 are no longer needed, nor are the capacitor 52 or the resistor 51. The resonant frequency of the receive circuit can be selected to be above or below the frequency of the powering burst $f_1$ depending upon the application and the transponders 14 used with the interrogator 12.

With reference now to FIG. 2, now together with FIG. 3 and FIG. 5, the system using PWM for the Write function will be described. This embodiment is substantially similar to the FSK embodiment. The differences from FIG. 1 are shown in FIG. 2. Particularly, in this embodiment the control circuit 16 further acts to select the resonant frequency of the tuned circuit 28 whereas in the FSK embodiment the modulator 48 performed this function, although the control circuit 16 could have also performed this function in the FSK embodiment. Since in this embodiment, a single frequency is used for the Write function modulation, only a single switch 50 need be controlled by the control circuit 16. Switch 50 is used to select between the powering/Write frequency $f_1$ and the center of the Read frequencies, $f_2$ and $f_3$. As is the characteristic for PWM demodulation, the demodulator 66 is able to demodulate the WRITE data from the interrogator 12 by measuring the length of the periods in which no RF energy is being sent. During these switch off phases, the control circuit 16 disables the amplifier 26 so that no RF energy is output from the interrogator 12. An exemplary PWM format would be for a high bit to be represented by a switch off period of a relatively longer time than for a low bit. For example, one polarity of the WRITE data might be represented by a switch off period of 1 ms, while the other polarity might be represented by a period of 0.3 ms. Thus it is possible to transmit information from the interrogator 12 to the transponder 14.

The sole table, below, provides an overview of the embodiments and the drawings:

TABLE

| Drawing Element | Generic Term | Preferred or Specific Term | Alternate Terms |
|---|---|---|---|
| 10 | Transponder Arrangement | | |
| 12 | Interrogator | Interrogator | Reader |
| 14 | Transponder | Transponder | Responder, Tag |
| 16 | Control Circuit | Interrogator Control Circuit | |
| 18 | Connection | Host Computer Connection | |
| 20 | Memory | Interrogator Memory | SRAM, DRAM, EEPROM |
| 22 | Display | | LCD, CRT, LED display, VF display |
| 24 | Carrier Wave Generator | Carrier Wave Generator | Oscillator, Crystal Oscillator |
| 26 | Buffer | Buffer/Amplifier | |
| 28 | Resonant Circuit | Interrogator $f_1$ Resonant Circuit | Antenna |
| 30 | Coil | | |
| 32 | Capacitor | | |
| 34 | Resonant Circuit | Transponder $f_1$ Resonant Circuit | Antenna |
| 36 | Coil | | |
| 38 | Capacitor | | |
| 40 | Control Circuit | Transponder Control Circuit | Microprocessor, Microcontroller |
| 42 | Reference Line | Reference Voltage | Reference Voltage Connection |
| 44 | Signal Line | Signal Line | Reference Signal Connection |
| 46 | Energy Storage Device | Storage Capacitor | Rechargeable Battery |
| 48 | Modulator | FSK Modulator | |

TABLE-continued

| Drawing Element | Generic Term | Preferred or Specific Term | Alternate Terms |
|---|---|---|---|
| 49 | Switch | Damping Switch | |
| 50,50a | Switch | | |
| 51 | Resistor | Damping Resistor | |
| 52,52a | Resonant Circuit | Interrogator $f_2$ Resonant Circuit | |
| 54 | Switch | | |
| 56 | Capacitor | | |
| 58 | Damping Element | Resistor | |
| 60 | Resonant Circuit | Transponder $f_3$ Resonant Circuit | |
| 62 | Memory | Transponder Memory | EEPROM, SRAM, ROM |
| 64 | Demodulator | Interrogator Filter/Demodulator | |
| 66 | Demodulator | FSK Demodulator | PLL FSK Demodulator |
| 70 | Switch | Transponder Modulator Switch | |
| 72 | Capacitor | Transponder Modulator Capacitor | |

A few preferred embodiments have been described in detail hereinabove. It is to be understood that the scope of the invention also comprehends embodiments different from those described, yet within the scope of the claims.

For example, "microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in full-duplex transponder arrangements or half-duplex transponder arrangements. Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A Radio Frequency Identification (RFID) system, said system comprising:
   a) an interrogator, said interrogator having
      i) a carrier wave generator for generating a powering burst of a powering frequency,
      ii) a demodulator for demodulating response data from an RF response from a transponder, said RF response being a wireless, modulated carrier signal,
      iii) a tuned circuit in electrical communication with said demodulator, said tuned circuit having a selected bandwidth about a communication frequency, said selected bandwidth not substantially overlapping said powering frequency and encompassing the bandwidth of the modulated carrier of said RF response,
      iv) a controller in electrical communication with said tuned circuit and said demodulator, said controller operable to enable said carrier wave generator to send said powering burst during a first time period and to enable said demodulator in electrical communication with said tuned circuit to receive said RF response during a second time period; and
   b) a transponder, said transponder having
      i) a tuned circuit operable to oscillate with a carrier having a frequency equal to the resonance frequency of said tuned circuit,
      ii) a tuning circuit in electrical communication with said tuned circuit for modifying the frequency characteristics of said tuned circuit such that the tuned circuit is operable to be tuned during said powering burst to said powering frequency and to be tuned during said RF response to said communication frequency, said powering signal causing the tuning circuit to oscillate with a carrier having said powering frequency, and
      iii) a modulator in electrical communication with said tuned circuit for modulating the carrier therein with RF response data to form said RF response.

2. The system of claim 1 wherein said interrogator tuned circuit comprises another tuning circuit whereby said another tuning circuit is operable to modify the frequency characteristics of said tuned circuit such that said tuned circuit is tuned during said powering burst to said powering frequency and tuned during said RF interrogation to said communication frequency.

3. The system of claim 1 wherein said modulator is a PPM modulator.

4. The system of claim 1 wherein said modulator is a FSK modulator operable to output a carrier of FSK frequencies $f_2$ and $f_3$ representing first and second data values.

5. The system of claim 4 wherein said communication frequency is between said FSK frequencies.

6. The system of claim 1 and further comprising an interrogator modulator for modulating WRITE data upon said RF interrogation.

7. The system of claim 6 wherein said interrogator modulator is a PPM modulator.

8. The system of claim 6 wherein said interrogator modulator is an FSK modulator.

9. The system of claim 6 wherein said interrogator further comprises a transmit antenna in electrical communication with said interrogator modulator and operable to transmit said RF interrogation in a wireless fashion, and a receive antenna in electrical communication with said demodulator and operable to receive said RF response from said transponder in a wireless fashion.

10. The system of claim 9 wherein said transmit antenna and said receive antenna are a single, unified antenna.

11. A Radio Frequency Identification (RFID) system, said system comprising an interrogator and a transponder wherein said interrogator and transponder are in wireless communication with each other through RF interrogations by said interrogator to said transponder and through RF responses from said transponder to said interrogator, wherein:

a) said interrogator comprises
  i) an RF oscillator,
  ii) a programmable divider in electrical communication with said RF oscillator and operable to selectively divide the oscillations thereof such that a first division factor causes a communication frequency signal to be output from said divider and a second division factor causes a factor causes a powering frequency signal to be output from said divider,
  iii) a first tuned circuit in electrical communication with said programmable divider, said first tuned circuit having a resonant frequency of said powering frequency, said first tuned circuit operable to send a powering burst,
  iv) a second tuned circuit in electrical communication with said programmable divider, said second tuned circuit having a selected bandwidth encompassing an RF response about said communication frequency, said selected bandwidth not substantially overlapping said powering frequency,
  v) a transmit antenna in electrical communication with said first tuned circuit and operable to transmit said powering burst as a wireless signal to said transponder and to transmit said RF interrogation thereto,
  vi) a receive antenna in electrical communication with said second tuned circuit, said receive antenna operable to receive said RF response,
  vii) a demodulator for receiving said RF response from said second tuned circuit and providing RF response data therefrom, and
  viii) a controller in electrical communication with said programmable divider, said demodulator, and said tuned circuits, said controller operable to enable said first tuned circuit to send said powering burst during a first time period and to enable said demodulator in electrical communication with said second tuned circuit to demodulate RF response data from said RF response during a second time period, said controller further operable to receive said RF response data from said demodulator; and b) a transponder, said transponder having
  i) a tuned circuit operable to oscillate with a carrier having a frequency equal to the resonance frequency of said tuned circuit,
  ii) a tuning circuit in electrical communication with said tuned circuit for modifying the frequency characteristics of said tuned circuit such that the tuned circuit is operable to be tuned during said powering burst to said powering frequency and to be tuned during said RF response to said communication frequency, said powering signal causing tuning circuit to oscillate with a carrier having said powering frequency,
  iii) a demodulator in electrical communication with said tuned circuit for receiving said RF interrogation therefrom and for demodulating interrogation data from said RF interrogation,
  iv) a modulator in electrical communication with said tuned circuit for modulating said RF response data upon said carrier, and
  v) a controller in electrical communication with said modulator, said demodulator, and said tuning circuit, said controller operable to control said tuning circuit to modify the frequency characteristics of said tuned circuit, to receive said interrogation data from said demodulator, and to provide said RF response data to said modulator.

12. A method for communicating between an interrogator and transponder, the method comprising the steps of:

a) tuning a transponder tuned circuit to a powering frequency;

b) sending a powering burst of said powering frequency to said transponder by an interrogator tuned circuit, said powering burst causing said tuning circuit to oscillate with a carrier having said powering frequency;

c) rectifying said powering burst in said transponder to supply power to the operating circuitry thereof;

d) upon termination of said powering burst, tuning said transponder to have a communicating frequency whereby the oscillation of said carrier will be at said communicating frequency, further selecting the bandwidth of said tuned circuit to be a selected width and not substantially encompassing said powering frequency;

e) entering a Read mode during which said modulator modulates data upon said carrier to form an RF response, said RF response having a bandwidth such that a substantial portion thereof lies within the bandwidth of said tuned circuit;

f) transmitting said RF response by said tuned circuit in electrical communication with said modulator; and g) receiving by a receiver circuit said RF response.

13. The method of claim 12 and further comprising the step of sending an "end-of-burst" signal after completion of said powering burst and prior to entering said Read mode.

14. The method of claim 12 and further comprising the step entering a Write mode prior to entering the Read mode during which the interrogator sends WRITE data to said transponder upon termination of said powering burst.

15. The method of claim 14 and further comprising the step of sending a short "end-of-burst" signal after completion of said powering burst and prior to entering said Write mode.

16. The method of claim 15 and further comprising the step of sending a long "end-of-burst" after completion of said Write mode and prior to entering said Read mode.

17. The method of claim 12 and further comprising the step of sending an "end-of-burst" signal after completion of said powering burst.

18. A transponder for a Radio Frequency Identification (RFID) system using an interrogator which sends RF interrogations to said interrogator and receives RF responses therefrom, said transponder comprising:

a) a tuned circuit operable to oscillate with a carrier having a frequency equal to the resonance frequency of said tuned circuit;

b) a tuning circuit in electrical communication with said tuned circuit for modifying the frequency characteristics of said tuned circuit such that the tuned circuit is operable to be tuned during said a powering burst to a powering frequency and to be tuned during said RF response to a modulation frequency; and c) a modulator in electrical communication with said tuned circuit for modulating the carrier therein with said RF response data to form said RF response, said modulated RF response not substantially overlapping said powering frequency.

19. An interrogator for sending RF interrogations and receiving RF responses from a transponder, said interrogator comprising:

a) a carrier wave generator for generating a powering burst of a powering frequency;

b) a demodulator for demodulating response data from an RF response from a transponder, said RF response being a wireless, modulated carrier signal;

c) a tuned circuit in electrical communication with said demodulator, said second tuned circuit having a selected bandwidth about a communication frequency, said selected bandwidth not substantially overlapping said powering frequency and encompassing the bandwidth of the modulated carrier of said RF response; and d) a controller in electrical communication with said receiver circuit, said tuned circuit, and said demodulator, said controller operable to enable said carrier wave generator to send said powering burst during a first time period and to enable said demodulator in electrical communication with said tuned circuit to receive said RF response during a second time period.

* * * * *